United States Patent
De Goes et al.

(10) Patent No.: US 8,487,884 B2
(45) Date of Patent: Jul. 16, 2013

(54) TOUCH SCREEN DETECTION AND DIAGNOSTICS

(75) Inventors: Marcos Augusto De Goes, Paulinia (BR); Alfredo Olmos, Campinas (BR); Stefano Pietri, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1341 days.

(21) Appl. No.: 12/145,004

(22) Filed: Jun. 24, 2008

(65) Prior Publication Data

US 2009/0315835 A1    Dec. 24, 2009

(51) Int. Cl.
*G06F 3/041* (2006.01)
(52) U.S. Cl.
USPC .................... 345/173; 345/174; 178/18.01
(58) Field of Classification Search
USPC .............. 345/173–178; 178/18.01–18.07
See application file for complete search history.

(56) References Cited

U.S. PATENT DOCUMENTS

| | | | |
|---|---|---|---|
| 3,699,439 A * | 10/1972 | Turner | 324/71.1 |
| 4,353,552 A | 10/1982 | Pepper, Jr. | |
| 4,365,235 A | 12/1982 | Greanias et al. | |
| 4,622,437 A * | 11/1986 | Bloom et al. | 178/18.05 |
| 4,660,055 A | 4/1987 | Enda | |
| 4,862,592 A | 9/1989 | Richard et al. | |
| 5,054,088 A | 10/1991 | Gunderson et al. | |
| 5,159,159 A * | 10/1992 | Asher | 178/18.05 |
| 5,249,296 A | 9/1993 | Tanaka | |
| 5,262,612 A | 11/1993 | Momany et al. | |
| 5,266,931 A | 11/1993 | Tanaka | |
| 5,410,334 A | 4/1995 | Comerford | |
| 5,434,370 A | 7/1995 | Wilson et al. | |
| 5,508,700 A | 4/1996 | Taylor et al. | |
| 5,510,813 A | 4/1996 | Makinwa et al. | |
| 5,561,447 A | 10/1996 | Suzuki et al. | |
| 5,764,797 A | 6/1998 | Adcock | |
| 5,796,355 A | 8/1998 | Smigelski | |
| 5,945,973 A | 8/1999 | Sakai et al. | |
| 5,990,875 A | 11/1999 | Bi et al. | |
| 6,011,873 A | 1/2000 | Desai et al. | |

(Continued)

FOREIGN PATENT DOCUMENTS

WO    03052933 A3    6/2003

OTHER PUBLICATIONS

PCT Application No. PCT/US2009/038853 International Search Report and Written Opinion dated Nov. 2, 2009.

(Continued)

*Primary Examiner* — Amare Mengistu
*Assistant Examiner* — Koosha Sharifi-Tafreshi (57) ABSTRACT

A method includes driving a current through a touch screen that is based on contact of the touch screen, generating a proportional second current, and detecting contact of the touch screen from the second current. Another method includes providing a touch screen with parallel plates, disabling contact detection when a plate voltage is lower than a threshold voltage, and enabling contact detection when the plate voltage is at least equal to the threshold voltage. A device includes a first node and a second node coupled to a touch screen, a third node, a first current mirror coupled to the second node and the third node configured to generate a current at the third node that is proportional to a second current at the second node, and a detection circuit that provides a signal based on the first current that indicates contact of the touch screen.

17 Claims, 5 Drawing Sheets

U.S. PATENT DOCUMENTS

| | | | |
|---|---|---|---|
| 6,118,205 A | 9/2000 | Wood et al. |
| 6,137,473 A | 10/2000 | Cortopassi et al. |
| 6,209,034 B1 | 3/2001 | Gladwin et al. |
| 6,256,009 B1 | 7/2001 | Lui et al. |
| 6,339,655 B1 | 1/2002 | Aharonson et al. |
| 6,340,967 B1 | 1/2002 | Maxted |
| 6,567,552 B2 | 5/2003 | Sakaguchi et al. |
| 6,633,671 B2 | 10/2003 | Munich et al. |
| 6,714,311 B2 | 3/2004 | Hashimoto |
| 6,917,033 B2 | 7/2005 | Hendriks et al. |
| 6,924,790 B1 | 8/2005 | Bi |
| 6,930,672 B1 | 8/2005 | Kuribayashi |
| 7,027,648 B2 | 4/2006 | Seto et al. |
| 7,105,752 B2 | 9/2006 | Tsai et al. |
| 7,113,173 B1 | 9/2006 | Bi et al. |
| 7,256,773 B2 | 8/2007 | Kolmykov-Zotov et al. |
| 7,330,590 B2 | 2/2008 | Seto et al. |
| 7,362,313 B2 | 4/2008 | Geaghan et al. |
| 7,372,455 B2 | 5/2008 | Perski et al. |
| 2003/0197496 A1* | 10/2003 | Wang | 323/315 |
| 2004/0183787 A1* | 9/2004 | Geaghan et al. | 345/173 |
| 2006/0097991 A1 | 5/2006 | Hotelling et al. |
| 2006/0202969 A1* | 9/2006 | Hauck | 345/173 |
| 2007/0291012 A1 | 12/2007 | Chang |
| 2009/0122024 A1* | 5/2009 | Nakamura et al. | 345/173 |

OTHER PUBLICATIONS

Rick Downs, "Using Resistive Touch Screens for Human/Machine Interface", Texas Instruments, Analog Applications Journal, 3Q 2005, 6 pages.

* cited by examiner

TOUCH SCREEN DETECTION AND DIAGNOSTICS

FIELD OF THE DISCLOSURE

The present disclosure is related generally to touch screens and more particularly to touch detection at a touch screen.

BACKGROUND

Touch screens are used to receive inputs from a user for use by an associated processing system. Detecting a touch to a touch screen typically requires analog circuitry to translate the touch into an analog signal, and analog-to-digital converters to translate the analog signal into a digital signal suitable to the needs of the processing system. Because of the wide variety of touch screen types, the analog circuitry is typically designed specifically for the particular touch screen panel used. Also, the introduction of analog-to-digital converters introduces a delay between the actual touch to the touch screen and the time needed for the processing system to recognize that the touch screen has been touched. Accordingly, an improved technique for detecting a touch to a touch screen would be advantageous.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

FIGS. 1-8 illustrate example techniques for detecting contact events to a touch screen. In one embodiment, the touch screen is configured such that a magnitude of the current output by the touch screen substantially changes in response to a contact event to the touch screen. A detection circuit is adapted to detect a contact event to the touch screen based on the change in the current output by the touch screen. Further, in one embodiment, one or more current mirrors are used to drive the current to the touch screen or to mirror the current from the touch screen for contact detection purposes. In certain instances, the touch screen can include a capacitive-type touch screen that may require pre-charging before use in detecting contact events. Because the pre-charging process may falsely be detected as a contact event, in one embodiment, a technique for disabling contact event detection until the pre-charging process is substantially complete is illustrated. Further, in one embodiment, one or more diagnostic processes can be implemented to determine whether there are any faults present in the touch screen.

For ease of describing circuit behavior, transistor elements are illustrated herein as Metal-Oxide-Silicon Field Effect Transistors (MOSFETs) of either the n-channel type (nMOSFET) or the p-channel type (pMOSFET). However, similar circuit behavior can be achieved with a wide variety of transistor types (e.g., bipolar junction transistors, bipolar junction field effect transistors, metal-oxide-silicon field effect transistors, thin film transistors, etc.) without departing from the scope of the present disclosure. Further, similar circuit behavior can be achieved by inverting the example circuits and substituting transistor types (e.g., substituting pMOSFETs for nMOSFETs and vice versa, substituting NPN bipolar junction transistors for PNP bipolar junction transistors and vice versa, etc.). Also, in many instances circuit elements of different types can be substituted without substantially affecting the function of the circuits (e.g., a transistor element may be a suitable substitute for a resistor element, etc.)

Figure 1:
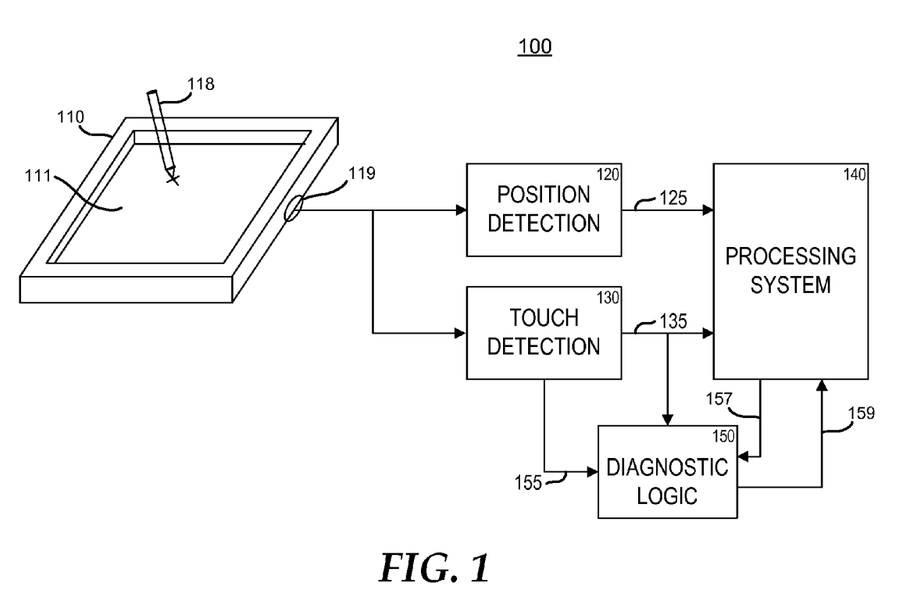
FIG. 1 illustrates an information handling system in accordance with at least one embodiment of the present disclosure.

FIG. 1 illustrates an information handling system 100 in accordance with at least one embodiment of the present disclosure. The information handling system 100 can be implemented as, for example, a touch panel-based automotive user interface (e.g., an electronic navigation system), a notebook computer, a computer kiosk, and the like. The information handling system 100 includes a touch panel 110, a position detection module 120, a touch detection module 130, a processing system 140, and diagnostic logic 150. The touch panel 110 includes a touch screen 111 and further can include a display (not illustrated) underlying the touch screen 111 or otherwise associated with the touch screen 111, in which case the touch panel 110 functions as a combined input/output device. The touch screen 111 can include any of a variety of touch screen architectures, including, but not limited to, a contact touch screen architecture, a resistive touch screen architecture, a capacitive touch screen architecture, an infrared touch screen architecture, a surface acoustic wave touch screen architecture, or any combination thereof.

The touch screen 111 includes an interface 119 to the various other components of the information handling system 100. The touch screen 111 is configured to provide, via the interface 119, signaling that changes based upon the presence of a touch (or "contact event") from a stylus 118 and the relative position of the stylus 118. The type of signal provided by the interface 119 is dependant upon the particular touch screen architecture implemented for the touch screen 111 and can include, for example, an analog electrical signal, a discrete electrical signal, an optical signal, or any combination thereof. The stylus 118 can include a pen-like device, a finger, another suitable implement adapted to the touch screen 111, or any combination thereof. As such, a contact event to the touch screen 111 can be from a stylus 118, another contact event that is detectable by the touch screen 111, or a combination thereof.

The touch screen 111 is coupled to the position detection module 120 via the interface 119. The position detection module 120 uses signaling provided via the interface 119 to identify the location of the stylus 118 on the touch screen 111 and provides an indication of the location of the stylus 118 on the touch screen 111 to the processing system 140 via a position indicator 125. The process of translating the signaling output by the interface 119 into the position indicator 125 typically is associated with the particular touch screen technology implemented by the touch screen 111. The position indicator 125 can be configured as a set of one or more digital values, as one or more analog signals, as an interrupt signal, or a combination thereof.

The signaling provided via interface 119 also is provided to the touch detection module 130. The touch detection module 130 uses the signaling to determine whether a contact event has occurred to the touch screen 111 (e.g., via the stylus 118 or other suitable contact event) and provides to the processing system 140 and the diagnostic logic 150 an indication of the presence or absence of a contact event to the touch screen 111 via a pendown indicator 135. The pendown indicator 135 can be configured as, for example, a set of one or more digital values, as one or more analog signals, as an interrupt signal, or a combination thereof.

The processing system 140 utilizes the pendown indicator 135 and the position indicator 125 to identify what input, if any, a user has provided and responds accordingly. To illustrate, in at least one embodiment, the processing system 140 can provide a graphical user interface (GUI) to be displayed underneath or otherwise in conjunction with the touch screen 111, whereby the GUI includes one or more user input fields, such as a "OK" button, a "Cancel" button, etc. The state of the pendown indicator 135 can be utilized by the processing system 140 to determine whether a contact event has occurred, and if so, the position indicator 125 can be used by the processing system 140 to determine where on the touch screen 111 the contact event occurred. The processing system 140 then can use this information to determine which user input field has been engaged by the user.

As described in greater detail herein, the touch screen 111 can be subjected to a number of faults that could affect the operation of the information handling system 100. Accordingly, in one embodiment, the diagnostic logic 150 receives the pendown indicator 135 from the touch detection module 130 and a test mode/user input signal 157 from the processing system 140, and based on these signals, the diagnostic logic 150 diagnoses the touch screen 111 for one or more faults. To illustrate, the processing system 140 can initiate a test mode by asserting the test mode/user input signal 157, in response to which the diagnostic logic 150 performs one or more diagnostic tests, including asserting a test signal 155 to the touch detection module 130. In the process of performing these tests, a user can initiate contact events to the touch screen 111 and verify the contact events with other inputs (not illustrated) to the processing system 140 (e.g., a keyboard input, a mouse input, etc.) The diagnostic logic 150 can monitor the pendown indicator 135 to determine the presence or absence of valid contact events. Based upon the results of the diagnostic tests, the diagnostic logic 150 can provide a fault indicator 159 to the processing system 140 to indicate the existence and type of faults in the touch panel 110.

Figure 2:
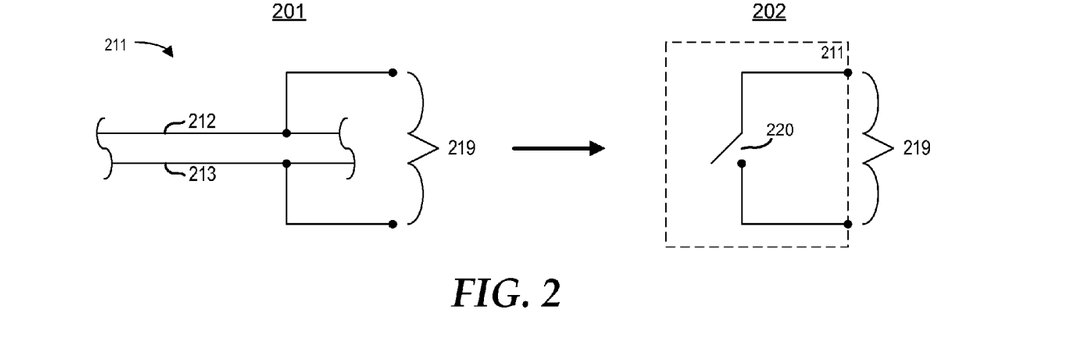
FIGS. 2 and 3 illustrate an example implementation of the touch screen of FIG. 1 as a touch screen in accordance with at least one embodiment of the present disclosure.
Figure 3:
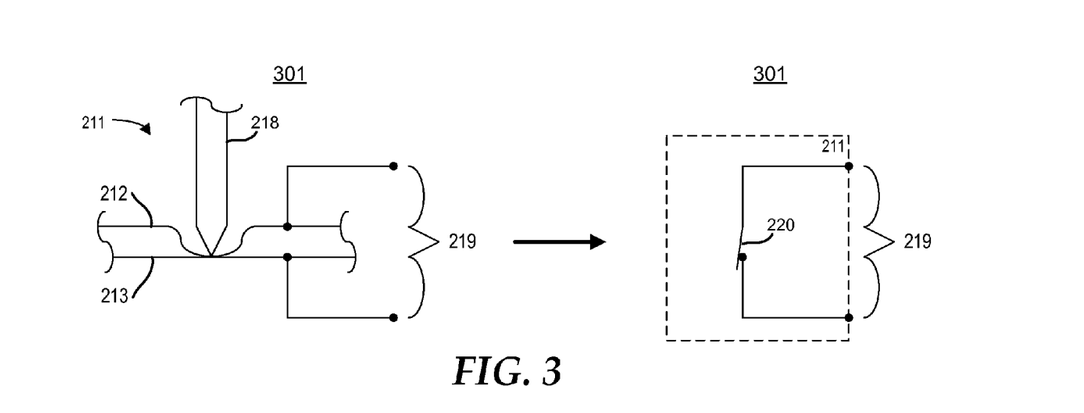

FIGS. 2 and 3 illustrate an example implementation of the touch screen 111 of FIG. 1 as a contact-type touch screen 211 in accordance with at least one embodiment of the present disclosure. As shown in view 201 of FIG. 2, the touch screen 211 includes a pair of parallel touch screen plates 212 and 213. Each of the touch screen plates 212 and 213 is coupled to a corresponding node of an interface 219 (corresponding to interface 119, FIG. 1). As illustrated by view 202, because the touch screen plates 212 and 213 are electrically isolated from each other when a contact event is not present (i.e., when the touch screen 211 is not being "touched"), the touch screen 211 can be modeled as a switch 220 in an effectively open-circuit state between the nodes of the interface 219.

View 301 of FIG. 3 illustrates a contact event occurring to the touch screen 211. Here, a stylus 218 deforms the touch screen plate 212 such that it comes into electrical contact with the touch screen plate 213. As such, the touch screen 211 can be modeled as the switch 220 in an effectively closed-circuit state between the nodes of the interface 219, as illustrated by view 302 of FIG. 3. Thus, as illustrated by FIGS. 2 and 3, the contact-type touch screen 211 can be modeled as the switch 220, whereby the switch 220 is substantially non-conductive when no contact event is occurring (and thereby presenting a relatively high resistance between the nodes of the interface 219) and the switch 220 is substantially conductive when a contact event is occurring (and thereby presenting a relatively low resistance between the nodes of the interface 219).

Figure 4:
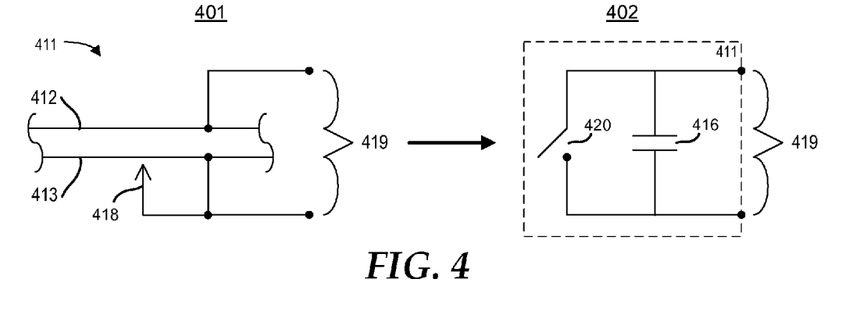
FIGS. 4 and 5 illustrate an example implementation of the touch screen of FIG. 1 as a capacitive-type touch screen in accordance with at least one embodiment of the present disclosure.
Figure 5:
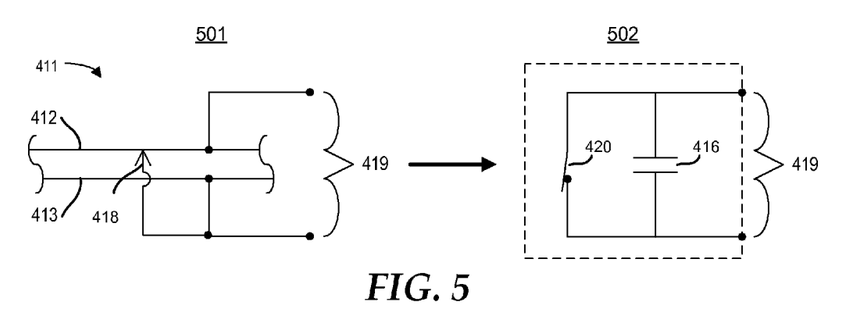

FIGS. 4 and 5 illustrate an example implementation of the touch screen 111 of FIG. 1 as a capacitive-type touch screen 411 in accordance with at least one embodiment of the present disclosure. As shown in view 401, the touch screen 411 includes a pair of parallel touch screen plates 412 and 413 separated by a dielectric material (not shown) and each coupled to a corresponding node of an interface 419 (corresponding to the interface 119, FIG. 1). As the touch screen plates 412 and 413 are electrically isolated from each other when a contact event is not present, driving the touch screen 411 with a current results in the accumulation of a charge across the touch screen plates 412 and 413. In this way, the touch screen plates 412 and 413 act as a capacitor. Thus, as illustrated by view 402, the touch screen 411 can be modeled as a switch 420 and a capacitor 416 coupled in parallel between the nodes of the interface 419, whereby the switch 420 has an open-circuit state in the absence of a contact event.

In this implementation, a stylus 418 is used to touch the touch screen 411, whereby the stylus 418 includes a device that is electrically coupled to the touch screen plate 413. As illustrated by view 501 of FIG. 5, when the stylus 418 makes electrical contact with the touch screen plate 412 (thereby causing a contact event to the touch screen 411), the touch screen plates 412 and 413 are brought into electrical contact via the stylus 418. Accordingly, as illustrated by view 502 of FIG. 5, the touch screen 411 can be modeled as the switch 420 and the capacitor 416 in parallel between the nodes of the interface 419, whereby the switch 420 has a closed-circuit state in the presence of a contact event.

FIGS. 2-5 illustrate that the operation of certain touch screens can be modeled as a switch having either an open-circuit state or closed-circuit state depending on whether a contact event is absent or present. However, while such modeling may not completely describe the circuit behavior of a touch panel in all cases, it will be appreciated that the switch model is sufficient to understand the techniques described herein. In particular, it will be appreciated that, when modeled as an open circuit switch, a particular touch panel technology may in fact permit a non-zero current flow, and that when modeled as a closed circuit switch, the particular touch panel technology may permit a different magnitude of current flow.

Figure 6:
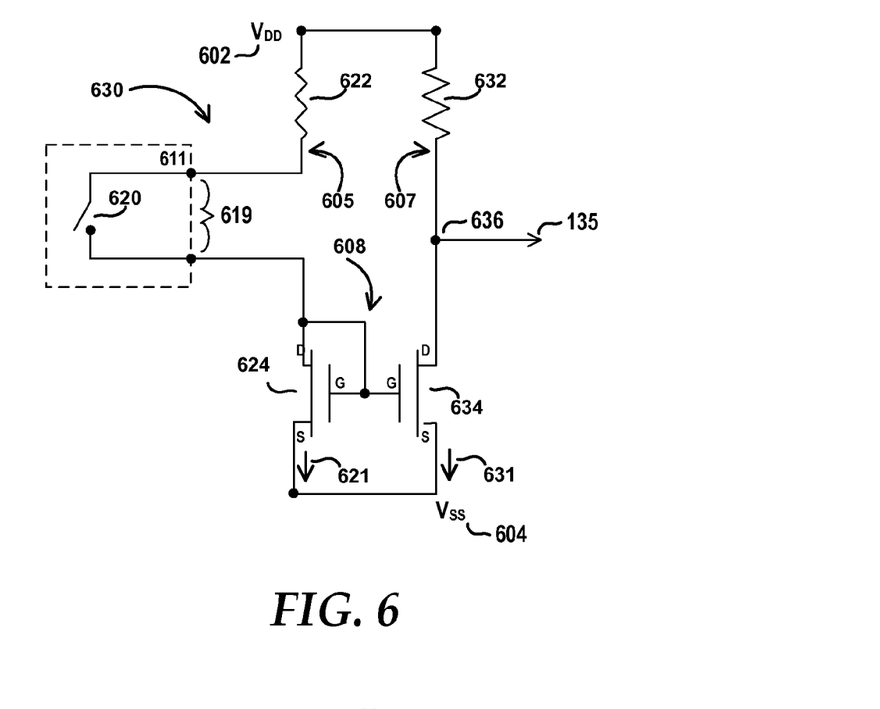
FIG. 6 illustrates an example touch screen and touch detection module in accordance with at least one embodiment of the present disclosure.

FIG. 6 illustrates an example touch screen 611 and touch detection module 630 in accordance with at least one embodiment of the present disclosure. The touch detection module 630 (corresponding to touch detection module 130, FIG. 1) includes a sense circuit 605 and a detection circuit 607. The touch screen 611 can include any of a variety of touch screen architectures. As discussed above, the touch screen 611 in many instances can be modeled as a switch 620 coupled between two nodes of an interface 619 of the touch screen 611, whereby the switch 620 has an open-circuit state in the absence of a contact event and a closed-circuit state in the presence of a contact event.

The sense circuit 605 includes a resistor 622 and a transistor 624 (illustrated as an nMOSFET). The detection circuit 607 includes a resistor 632 and a transistor 634 (also illustrated as an nMOSFET). The resistor 622 includes one electrode configured to receive a voltage $V_{dd}$ (voltage 602) and another electrode adapted to be coupled to a first node of the interface 619. The transistor 624 includes a drain electrode adapted to be coupled to a second node of the interface 619, a source electrode configured to receive a voltage $V_{ss}$ (voltage 604), and a gate electrode coupled to the drain electrode of the transistor 624. The resistor 632 includes an electrode configured to receive the voltage $V_{dd}$ and another electrode coupled to a node 636 (identified herein as "detection node 636"). The transistor 634 includes a drain electrode coupled to the detection node 636, a source electrode configured to receive the voltage $V_{ss}$ and a gate electrode coupled to the gate electrode of the transistor 624. Thus, the particular configuration of the sense circuit 605 and the detection circuit 607 forms a current mirror 608 between the interface 619 and the detection node 636. In one embodiment, the state of the detection node 636 is used to generate the pendown indicator 135 (FIG. 1), indicating the presence or absence of a contact event to the touch screen 611. As such, the detection node 636 can be coupled to a logic element (not illustrated) that functions similarly to the processing system 140.

In operation, the touch screen 611 is powered through the first node of the interface 619 (via the resistor 622) and is configured to provide, via the second node of the interface 619, a sense current 621 based on the absence or presence of a contact event. The current mirror 608 generates a detection current 631 that is proportional to the sense current 621. The detection node 636 can be pulled to near the voltage $V_{ss}$ or near the voltage $V_{dd}$ depending on the magnitude of the detection current 631. As noted above, when a contact event is absent, the touch screen 611 can be modeled as the switch 620 in an open-circuit state between the first node and the second node of the interface 619, and thus the magnitude of the sense current 621 (and correspondingly the magnitude of the detection current 631) is relatively low or even zero in the absence of a contact event. Conversely, when a contact event is present, the touch screen 611 can be modeled as the switch 620 in a closed-circuit state, and thus the magnitude of the sense current 621 (and correspondingly the magnitude of the detection current 631) is relatively high. Accordingly, the detection node 636 is pulled near to voltage $V_{ss}$ when a contact event is present at the touch screen 611, and is pulled near to voltage $V_{dd}$ when a contact event is absent. Thus, the detection node 636 being at or near the voltage $V_{ss}$ can be interpreted as an assertion of the pendown indicator 135 (FIG. 1), thereby indicating a contact event. Conversely, the detection node 636 being at or near the voltage $V_{dd}$ can be interpreted as a deassertion or nonassertion of the pendown indicator 135, thereby indicating the absence of a contact event. It will be appreciated that the addition of an inverter (not illustrated) with the input coupled to the detection node 636, and the output forming the pendown indicator 135 will result in a high (logic level "1") pendown indication.

It will be appreciated that the detection current 631 can be greater than, less than, or substantially equal to the sense current 621, depending on the relative output transconductances of the transistor 624 and the transistor 634 (e.g., by creating transistors 624 and 634 with different device characteristics), and that the magnitude of the detection current 631 can be chosen in conjunction with the value of the resistor 632 to create a large enough voltage drop at the detection node 636 to meet the logic thresholds of any logic element (not illustrated) coupled to the detection node 636.

Figure 7:
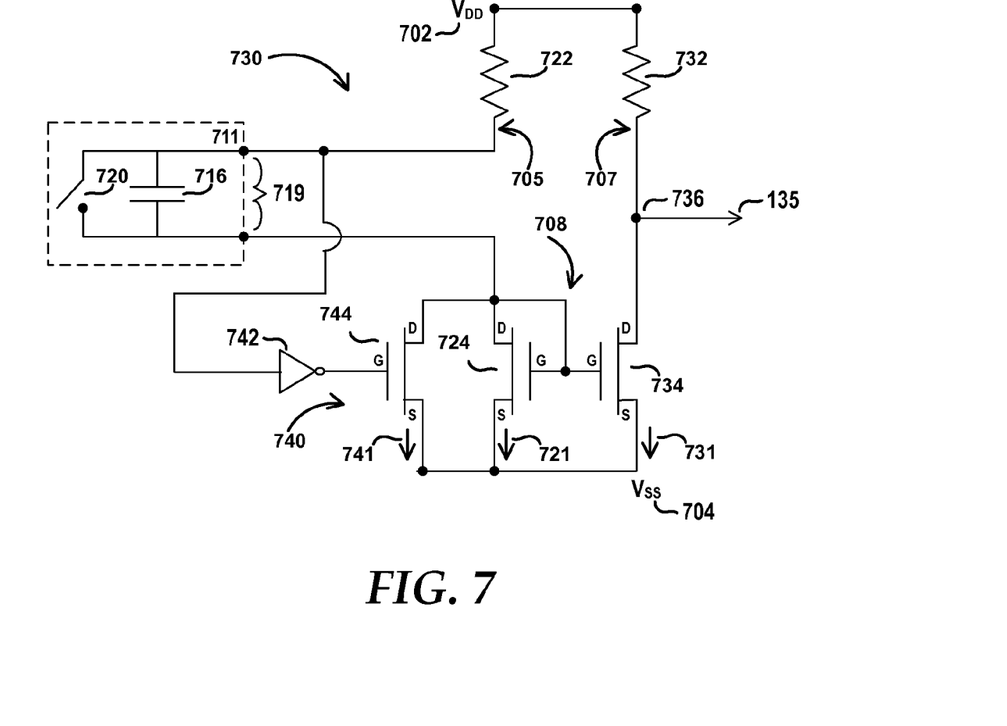
FIG. 7 illustrates an example touch screen, a touch detection module, and pre-charge circuit in accordance with at least one embodiment of the present disclosure.

FIG. 7 illustrates an example touch screen 711 and touch detection module 730 in accordance with at least one embodiment of the present disclosure. The touch detection module 730 (corresponding to touch detection module 130, FIG. 1) includes a sense circuit 705, a detection circuit 707, and a pre-charge circuit 740. In the depicted example, the touch screen 711 is implemented as a capacitive-type touch screen and thus can be modeled as a switch 720 and a capacitor 716 coupled in parallel between two nodes of an interface 719 of the touch screen 711.

The sense circuit 705 includes a resistor 722 and a transistor 724 (illustrated as an nMOSFET). The detection circuit 707 includes a resistor 732 and a transistor 734 (also illustrated as an nMOSFET). The pre-charge circuit 740 includes an inverter 742 and a transistor 744 (illustrated as an nMOSFET). The resistor 722 includes one electrode configured to receive a voltage $V_{dd}$ (voltage 702) and another electrode adapted to be coupled to a first node of the interface 719. The transistor 724 includes a drain electrode adapted to be coupled to a second node of the interface 719, a source electrode configured to receive a voltage $V_{ss}$ (voltage 704), and a gate electrode coupled to the drain electrode of the transistor 724. The resistor 732 includes an electrode configured to receive the voltage $V_{dd}$ and another electrode connected to a node 736 (identified herein as "detection node 736"). The transistor 734 includes a drain electrode coupled to the detection node 736, a source electrode configured to receive the voltage $V_{ss}$ and a gate electrode coupled to the gate electrode of the transistor 724. The inverter 742 includes an input coupled to the first node of the interface 719 and an output. The transistor 744 includes a drain electrode connected to the second node of the interface 719, a source electrode configured to receive the voltage $V_{ss}$, and a gate electrode coupled to the output of the inverter 742.

The particular configuration of the sense circuit 705 and the detection circuit 707 forms a current mirror 708 between the interface 719 and the detection node 736. In one embodiment, the state of the detection node 736 is used to generate the pendown indicator 135 (FIG. 1), indicating the presence or absence of a contact event to the touch screen 711. In detecting the presence or absence of a contact event to the touch screen 711, the touch detection module 730 functions similarly to the touch detection module 630 of FIG. 6 as described above. As such, in the absence of a contact event, the touch screen 711 is in effect an open switch 720 and thus a sense current 721 output by the touch screen 711 is substantially zero, a corresponding detection current 731 generated by the current mirror 708 is substantially zero in proportion to the sense current 721, and the detection node 736 is at a high voltage level. In the presence of a contact event to the touch screen 711, the touch screen 711 is in effect a closed switch 720, permitting the sense current 721 to rise. The current mirror 708 changes the magnitude of the detection current 731 in proportion to the rise in the sense current 721, and the detection node 736 is pulled to a low voltage level. Here, as above, the functionality of the touch detection module 730 can be reversed by reversing the behavior of the switch 720 (e.g., absence of a contact event closes the switch 720 and presence of a contact event opens the switch 720) such that the presence of a contact event to the touch screen 711 results in a high voltage level at the detection node 736, and the absence of a contact event to the touch screen 711 results in a low voltage level at the detection node 736. It will be appreciated that the addition of an inverter (not illustrated) with the input coupled to the detection node 736, and the output forming the pendown indicator 135 will result in a high (logic level "1") pendown indication.

A capacitive-type touch screen 711 can require pre-charging in order to operate correctly. The pre-charge circuit 740 can facilitate this pre-charging. Before power is applied to the touch detection module 730, the first node of the interface 719, the resistor 722, and the input to the inverter 742 are at a low voltage level, and the output of the inverter 742 is at a high voltage level. Because the output of the inverter 742 is coupled to the gate of the transistor 744, the high voltage level of the output of the inverter 742 enables the transistor 744 (i.e., renders the transistor 744 conductive), thereby permitting a pre-charge current 741 to flow to pre-charge the touch screen 711. When the power is first applied to the touch detection module 730, the pre-charge current 741 that flows into the capacitor 716 (as a model of the capacitance of the touch screen 711) is high and the voltage drop across the resistor 722 is also high, so the voltage at the input of the inverter 742 remains low and the transistor 744 remains enabled. As the touch screen 711 (e.g., the capacitor 716) charges, the pre-charge current 741 drops, as does the voltage drop across the resistor 722, so the voltage at the input of the inverter 742 rises. When the voltage at the first node of the interface 719 (and thus the voltage at a select plate of a pair of parallel conductive plates implementing the touch screen 711) reaches a threshold voltage, the output of the inverter 742 inverts to a low voltage level, which disables the transistor 744, thus terminating the pre-charge current 741 and halting the pre-charge of the touch screen 711. Thus, the threshold voltage can be the threshold voltage of the inverter 742 which causes the inversion from the high voltage level to the low voltage level. After the pre-charging is completed, the touch detection module 730 is ready to detect contact events to the touch screen 711, as described above. The resistor 722 and the transistor 744 can be chosen to provide the appropriate pre-charge performance for the specific touch screen 711. It will be appreciated that the input of the inverter 742 can include a current limiter (not illustrated).

Figure 8:
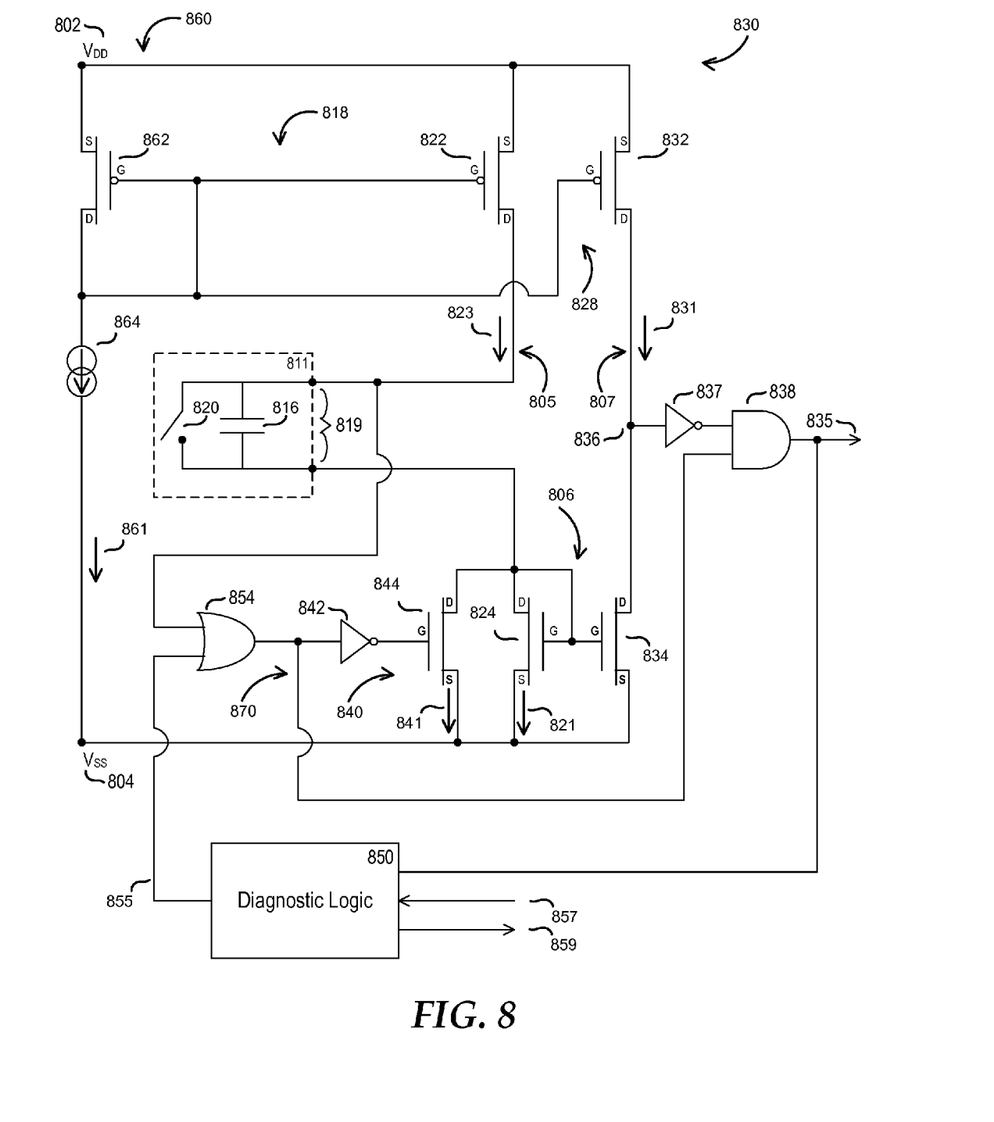
FIG. 8 illustrates an example touch screen, a touch detection module, a pre-charge circuit, and diagnostic logic in accordance with at least one embodiment of the present disclosure.

FIG. 8 illustrates an example touch screen 811, a touch detection module 830, and diagnostic logic 850 in accordance with at least one embodiment of the present disclosure. In the depicted example, the touch detection module 830 (corresponding to touch detection module 130, FIG. 1) includes a sense circuit 805, a detection circuit 807, a pre-charge circuit 840, a reference circuit 860, and a false pendown protection circuit 870. The touch screen 811 can include any of a variety of touch screen architectures, and as similarly discussed above, can be modeled as a switch 820 coupled in parallel with a capacitor 816 between nodes of an interface 819 of the touch screen 811. In the alternative, the touch screen 811 can be modeled as a switch 820 with an output (not illustrated) as described above. The sense circuit 805 includes a transistor 822 and a transistor 824, illustrated as a pMOSFET and an nMOSFET, respectively. The detection circuit 807 includes a transistor 832 and a transistor 834, illustrated as a pMOSFET and an nMOSFET, respectively. The pre-charge circuit 840 includes an inverter 842 and a transistor 844 (illustrated as an nMOSFET). The reference circuit 860 includes a transistor 862 (illustrated as a pMOSFET) and a current source 864. The false pendown protection circuit 870 includes an OR gate 854, an inverter 837, and an AND gate 838.

The transistor 832 includes a source electrode configured to receive a voltage $V_{dd}$ (voltage 802), a gate electrode, and a drain electrode coupled to a node 836 (identified herein as the "detection node 836"). The transistor 834 includes a drain electrode coupled to the detection node 836, a gate electrode, and a source electrode configured to receive a voltage $V_{ss}$ (voltage 804). The inverter 837 includes an input coupled to the detection node 836, and an output coupled to one input of the AND gate 838. The transistor 822 includes a source electrode configured to receive the voltage $V_{dd}$, a gate electrode, and a drain electrode adapted to be coupled to a first node of the interface 819. The transistor 824 includes a drain electrode adapted to be coupled to a second node of the interface 819, a gate electrode coupled to the drain electrode, and a source electrode configured to receive the voltage $V_{ss}$. The transistor 862 includes a source electrode configured to receive the voltage $V_{dd}$, gate electrode coupled to the gate electrodes of the transistors 822 and 832, and a drain electrode coupled to the gate electrode. The current source 864 includes an input coupled to the drain and gate electrodes of the transistor 862, and an output coupled to the voltage $V_{ss}$. The OR gate 854 includes one input coupled to the first node of the interface 819, another input coupled to receive a test signal 855 from the diagnostic logic 850, and an output. It will be appreciated that the input of the OR gate 854 can include a current limiter (not illustrated). The inverter 842 includes an input coupled to the output of the OR gate 854 and an output. The transistor 844 includes a gate electrode coupled to the output of the inverter 842, a drain electrode coupled to the second node of the interface 819, and a source electrode configured to receive the voltage $V_{ss}$. The AND gate 838 includes one input coupled to the output of the inverter 837, another input coupled to the output of the OR gate 854, and an output to provide a pendown indicator 835 (corresponding to the pendown indicator 135, FIG. 1), whereby the pendown indicator 835 is provided to the processing system 140 (FIG. 1). It will be appreciated that the input of the inverter 837 can include a current limiter (not illustrated).

The diagnostic logic 850 (corresponding to the diagnostic logic 150, FIG. 1) includes inputs to receive the pendown indicator 835 and a test mode/user input signal 857 (corresponding to the test mode/user input signal 157, FIG. 1), and outputs to provide a test signal 855 (corresponding to the test signal 155, FIG. 1), and a fault indicator 859 (corresponding to the fault indicator 159, FIG. 1). The test signal 855 can be used to facilitate diagnostic analysis of the test screen 811 and the fault indicator 859 can be utilized to report any faults detected during the diagnostic analysis. The diagnostic logic 850 can be implemented as hardware (e.g., an application specific integrated circuit (ASIC) or a field programmable gate array (FPGA)), software or firmware executed by one or more processing devices, or a combination thereof.

The circuit configuration depicted in FIG. 8 provides three current mirrors: a current mirror 806 implemented via transistor 824 and 834, a current mirror 818 implemented via transistors 862 and 822, and a current mirror 828 implemented via transistor 862 and 832. In operation, the current source 864 drives a reference current 861 through transistor 862. Because the gates of transistor 822 and 862 are coupled together to form the current mirror 818, the transistor 822 is on, and tries to drive a current 823 that is proportional to the current 861 into the interface 819. Whether or not current 823 is in fact proportional to current 861 will depend on the state of the switch 820. When the switch 820 is open (e.g., in the absence of a contact event), the current 823 will be low. When the switch 820 is closed (e.g., in the presence of a contact event), the current 823 will be proportional to the current 861. The current 823 can flow through the transistor 824 (hereinafter referred to as a current 821), or through the transistor 844 (hereinafter referred to as a current 841), depending on the particular mode in which the touch detection module 830 is operating.

It will be appreciated that a mirror current can be substantially equal to the associated reference current, or the mirror current can be proportionally greater than or proportionally less than the associated reference current, depending on the relation of the output transconductance of the reference transistor to the output transconductance of the mirror transistor (e.g., by creating transistors with different device characteristics). The relation between the reference current and the mirror current is referred to as the mirror aspect ratio (MR). Where the output transconductances are substantially equal, the reference current and the mirror current will be substantially equal, and the current mirror will have a mirror aspect ratio equal to 1 (i.e., MR=1). If the output transconductance of the reference transistor is greater than the output transconductance of the mirror transistor, the mirror current will be proportionally less than the reference current, and the current mirror will have a mirror aspect ratio less than 1 (i.e., MR<1). If the output transconductance of the reference transistor is less than the output transconductance of the mirror transistor, the mirror current will be proportionally greater than the reference current, and the current mirror will have a mirror aspect ratio greater than 1 (i.e., MR>1).

In one embodiment of the present disclosure, the voltage at the detection node 836 must vary to a sufficient degree to meet the logic level thresholds of the inverter 837, in order to distinguish between the presence and the absence of a contact event to the touch screen 811. It will be appreciated that the degree to which the detection node 836 voltage varies can be manipulated by varying relative the output transconductances of the transistors 822, 824, 832, and 834. In a particular embodiment, the detection node 836 voltage swing is created by ensuring that the output transconductance of the transistor 822 is greater than the output transconductance of the transistor 832 (e.g., by creating transistors 822 and 832 with different device characteristics), and that the output transconductance of the transistor 824 is substantially equal to the output transconductance of the transistor 834 (e.g., by creating transistors 824 and 834 with similar device characteristics). It will also be appreciated that the inverter 837 will invert the voltage seen at the detection node 836, such that the presence of a contact event to the touch screen 811 will result in a logic level "1" at the pendown indicator 835, and the absence of a contact event to the touch screen 811 will result in a logic level "0" at the pendown indicator 835.

As similarly discussed above with reference to FIG. 7, the pre-charge circuit 840 operates to facilitate pre-charging of the touch screen 811 (the capacitance being modeled by the capacitor 816). Here, the transistors 822 and 844 can be chosen to provide the appropriate pre-charge performance for the specific touch screen 811. In another embodiment, the current 861 can be chosen to provide the appropriate pre-charge performance for the specific touch screen 811. In yet another embodiment (not illustrated), the voltage at the first node of the interface 819 can be monitored and the current 861 adjusted based upon the voltage to improve the pre-charge performance for the specific touch screen 811.

However, a potential consequence of the implementation of the pre-charge circuit 840 is the creation of a false touch or pendown indication at the detection node 836. Because the drain electrode of the transistor 844 is coupled to the gate electrode of the transistor 834, before the transistor 844 is turned on, a momentary current can flow into the transistor 824, and the resulting inrush current can be mirrored into the detection circuit 830. Thus, without adequate safeguards, when the touch screen 811 is being pre-charged, the voltage at the detection node 836 can momentarily drop and thus falsely indicate the presence of a contact event to the touch screen 811 when no contact event has actually occurred. Accordingly, the false pendown protection circuit 870 is used to protect against false contact events resulting from the pre-charging process. In the depicted example, the voltage at the first node of the interface 819 (and thus the higher-voltage parallel plate of a capacitive-type touch screen 811) is provided as one input to the OR gate 854 (with the other input to the OR gate 854 being the test signal 855). As described below, the test signal 855 is not asserted (i.e., maintained at a low voltage in this circuit implementation) when the touch detection module 830 is in an operational mode. Thus, the output of the OR gate 854 reflects the voltage at the first node of the interface 819 during the operational mode. Accordingly, while the touch screen 811 is not sufficiently charged, the output of the OR gate 854 remains at a low voltage level, which in turn keeps the transistor 844 enabled to permit further pre-charging, but also prevents the output of the AND gate (and thus the pendown indicator 835) from going to a high voltage level. Once the touch screen 811 has been sufficiently charged, the output of the OR gate 854 switches to a high voltage level, which in turn disables the transistor 844 so as to halt pre-charging, while also permitting the output of the AND gate 838 to go high if the detection node 836 is pulled low in response to a contact event in the process described above. Thus, by eliminating the ability to signal a contact event via the pendown indicator 835 until the touch screen 811 is sufficiently pre-charged, potential for false contact event detection due to pre-charging requirements can be substantially reduced or eliminated.

In at least one embodiment, the diagnostic logic 850 functions to determine whether various fault conditions exist in the touch screen 811. Such fault conditions can include a non-responsive touch screen 811 (e.g., a persistent open-circuit state or a persistent short-circuit state between the plates of the touch screen 811 or the touch screen 811 can be shorted to the voltage $V_{dd}$ or the voltage $V_{ss}$) or the touch screen 811 can be missing (e.g., no touch panel installed). The processing system 140 (FIG. 1) can configure the diagnostic module 850 to enter into a test mode by sending a signal to the diagnostic logic 850 on the test mode/user input 857. The processing system 140 then can prompt a user to create a series of contact events. The diagnostic logic 850 can determine if the pendown indicator 835 is responding properly to the contact events, whereby the diagnostic logic 850 can manipulate the state of the test signal 855 to conduct various diagnostic processes, as described below. To ensure that the user actually attempted a contact event, the processing system 140 can prompt the user to enter an alternate input (e.g., via a keyboard input, a mouse input, etc.), and indicate such an input to the diagnostic logic 850. The diagnostic logic 850 can communicate the presence or absence of fault conditions to the processing system 140 via the fault indicator 859.

To illustrate, one diagnostic process can include diagnosing whether the touch screen 811 is shorted to the voltage $V_{SS}$ or to the voltage Vdd. In this test, the diagnostic logic 850 maintains the test signal 855 at low voltage level. If the touch screen 811 is shorted to the voltage $V_{ss}$ with the test signal 855 low, the pendown indicator 835 will remain at a low voltage level (thereby indicating the absence of a contact event) regardless of whether the touch screen 811 is touched or not. Conversely, if the touch screen 811 is shorted to the voltage Vdd with the test signal 855 low, the pendown indicator 835 will remain at a high voltage level (thereby indicating the presence of a contact event) regardless of whether the touch screen 811 is touched or not. The diagnostic logic 850 therefore can set the test signal 855 low and observe the behavior of the pendown indicator 835 while the user engages in one or more touches to the touch screen 811 (and confirmed by the user via, for example, a keyboard or mouse) and report a short to $V_{ss}$ fault or a short to $V_{dd}$ fault if one is detected.

Another diagnostic process can include diagnosing whether the touch screen 811 is open-shorted or closeshorted. In this test, the diagnostic logic 850 maintains the test signal 855 at a high voltage level. If the touch screen 811 is in open-circuit and the test signal 855 is high, the pendown indicator 835 will stay low regardless of whether the touch screen 811 is touched or not. Conversely, if the touch screen 811 is in closed-circuit and the test signal 855 is high, the pendown indicator 835 will stay high regardless of whether the touch screen 811 is touched or not. Accordingly, the diagnostic logic 850 therefore can set the test signal 855 high and observe the behavior of the pendown indicator 835 while the user engages in one or more touches to the touch screen 811 (and confirmed by the user) and report an open-circuit fault or a short-circuit fault if one is detected.

In an aspect of the present disclosure, a method can include driving a first current at a touch screen with a magnitude based on a presence of a contact event to the touch screen, generating a second current proportional to the first current, and detecting a contact event to the touch screen based on the second current.

In another aspect of the present disclosure, a method can include providing a touch screen that includes a pair of parallel conductive plates, disabling detection of a contact event to the touch screen responsive to a select plate of the pair of parallel conductive plates having a voltage lower than a threshold voltage, and enabling detection of a contact event to the touch screen responsive to the select plate having a voltage at least equal to the threshold voltage.

In a third aspect of the present disclosure, a device can include a first node adapted to be coupled to an interface of a touch screen, a second node adapted to be coupled to the interface of the touch screen, a third node, a first current mirror coupled to the second node and the third node that is configured to generate a first current at the third node that is proportional to a second current at the second node, and a detection circuit adapted to provide a signal based on first current that indicates whether a contact event is present at the touch screen.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
   driving a first current at a touch screen in response to a contact event to the touch screen, a magnitude of the first current based on a presence of the contact event to the touch screen;
   generating a second current proportional to the first current via a first current mirror;
   generating a voltage at a detection node based on the second current;
   detecting the contact event based on the voltage at the detection node; and
   determining whether the touch screen is shorted to a reference voltage based on whether the voltage at the detection node changes in response to a presence of the contact event at the touch screen.

2. The method of claim 1, further comprising generating the first current via a second current mirror and a reference current.

3. The method of claim 1, further comprising:
   determining whether the touch screen is in one of a persistent open-circuit state or a persistent closed-circuit state based on whether the voltage at the detection node changes in response to a presence of the contact event at the touch screen.

4. The method of claim 1, wherein the touch screen comprises a pair of parallel conductive plates, the method further comprising:
   disabling detection of the contact event responsive to a select plate of the pair of parallel conductive plates having a voltage lower than a threshold voltage; and
   enabling detection of the contact event responsive to the select plate having a voltage at least equal to the threshold voltage.

5. A method comprising:
   providing a touch screen comprising a pair of parallel conductive plates;
   disabling detection of a contact event to the touch screen responsive to a select plate of the pair of parallel conductive plates having a voltage lower than a threshold voltage, wherein the contact event results in an electrical contact between the pair of parallel conductive plates; and
   enabling detection of a contact event to the touch screen responsive to the select plate having a voltage at least equal to the threshold voltage.

6. The method of claim 5, further comprising:
   driving a current to the touch screen, the current having a magnitude based on whether a contact event is present at the touch screen, wherein the current is a direct current;
   generating a voltage at a detection node based on the current; and
   in response to enabling detection of a contact event, detecting a contact event based on the voltage at the detection node.

7. The method of claim 6, further comprising:
   determining whether the touch screen is shorted to a supply voltage based on whether the voltage at the detection node changes in response to a presence of the contact event at the touch screen.

8. The method of claim 6, further comprising:
   determining whether the touch screen is in one of a persistent open-circuit state or a persistent closed-circuit state based on whether the voltage at the detection node changes in response to a presence of the contact event at the touch screen.

9. A device comprising:
   a first node adapted to be coupled to an interface of a touch screen;
   a second node adapted to be coupled to the interface of the touch screen;
   a third node;
   a first current mirror coupled to the second node and the third node, the first current mirror configured to generate a first current at the third node that is proportional to a second current flowing through the touch screen from the first node to the second node; and
   a detection circuit adapted to provide a signal based on the first current, the signal indicating whether a contact event is present at the touch screen.

10. The device of claim 9, further comprising:
    a second current mirror coupled to the first node, the second current mirror configured to generate the second current at the first node based on a reference current.

11. The device of claim 10, further comprising:
    a third current mirror coupled to the third node, the third current mirror configured to generate the first current at the third node in conjunction with the first current mirror and based on the reference current.

12. The device of claim 9, wherein the touch screen comprises a pair of parallel capacitive plates, the device further comprising:
   a pre-charge circuit adapted to pre-charge the pair of parallel capacitive plates based on the second current.

13. The device of claim 12, further comprising:
   a false touch detect circuit adapted to:
      configure the first logic to disable detection of a contact event to the touch screen responsive to a select plate of the pair of parallel conductive plates having a voltage lower than a threshold voltage; and
      configure the first logic to enable detection of a contact event to the touch screen responsive to the select plate having a voltage at least equal to the threshold voltage.

14. The device of claim 9, further comprising:
   diagnostic logic adapted to determine whether the touch screen is shorted to a supply voltage based on whether a voltage at the third node changes in response to a presence of a contact event at the touch screen.

15. The device of claim 9, further comprising:
   diagnostic logic adapted to determine whether the touch screen is in one of a persistent open-circuit state or a persistent closed-circuit state based on whether a voltage at the third node changes in response to a presence of a contact event at the touch screen.

16. The method of claim 1, wherein the first current is a direct current.

17. The device of claim 9, wherein the first current is a direct current.

* * * * *